UNITED STATES PATENT OFFICE 1,933,206

MANUFACTURE OF AMIDINES

Tom Birchall, Manchester, and Ernest Harry Rodd, Timperley, England, assignors to Imperial Chemical Industries Limited, a corporation of Great Britain No Drawing. Application May 16, 1931, Serial No. 537,992, and in Great Britain May 16, 1930

13 Claims. (Cl. 260—128)

It is known that when primary aromatic amines and formic acid interact diarylformamidines, Ar.NH.CH=N—Ar (Ar representing an aryl radical), are formed, but the yields obtained are low, as the interaction proceeds very slowly.

According to the present invention we effect interaction by heating together formic acid and a primary aromatic amine (aniline, toluidine or the like) in the presence of boric acid (or a borate) and/or metallic iron.

We find that boric acid (or a borate) has a catalytic effect on the reaction described above, amidine-formation being accelerated to a very considerable degree. We further find that metallic iron has a similar catalytic effect, and, surprisingly, that the two catalysts assist one another. Thus, by our invention, a process which would scarcely be regarded as technically feasible is so improved as to provide an economical method of manufacturing valuable intermediates for use in dyestuff manufacture.

Our invention is illustrated but not limited by the following examples in which the parts are by weight.

Example 1

To 744 parts of aniline and 92 parts of formic acid are added 5 parts of borax. The mixture is boiled for 8 hours under a reflux condenser so arranged that water passes out of the system whereas aniline is retained. The excess of aniline is now removed by distillation under diminished pressure. The residue is dissolved in a suitable solvent immiscible with water, e. g. benzene, and dilute aqueous hydrochloric acid is added until there is a slight excess of acid in the aqueous layer. Diphenylformamidine as monohydrochloride separates from this aqueous layer in the form of a sparingly soluble crystalline precipitate; a further quantity is isolated as base by making the aqueous mother liquors alkaline. The benzene solution contains formanilide. The yield of diphenylformamidine obtained in 8 hours is 42% of that calculated from the formic acid used, whereas when no borax is present the yield in an otherwise similar preparation is 35%.

Example 2

Aniline and formic acid are caused to interact as in Example 1 in presence of 20 parts of cast iron turnings instead of 5 parts of borax. The yield of diphenylformamidine is 46%.

Example 3

Aniline and formic acid are caused to interact as in Example 1 in presence of 20 parts of cast iron turnings as well as 5 parts of borax. The yield of diphenylformamidine is 72%.

It will be seen that in the given examples a great excess of aniline is used. Our invention relates, as will be understood, to improvements in a process which may be represented by the equation:—

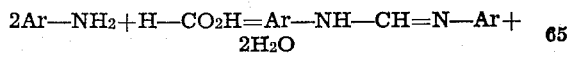

(wherein Ar represents phenyl, etc.) and in accordance with this, with each molecular proportion of formic acid there must interact two molecular proportions of e. g. aniline. The interaction proceeds so slowly, however, that an excess of aniline, for example, is necessary in practice, whether or not a catalyst is used in accordance with our invention. It will be understood that the excess indicated in the above examples is illustrative only, and that we do not confine ourselves to the use of any proportions other than those required by the equation given above.

As many apparently widely different embodiments of this invention may be made without departing from the spirit and scope thereof, it is to be understood that we do not limit ourselves to the specific embodiments thereof except as defined in the appended claims.

We claim:

1. A process for the manufacture of diphenylformamidines which includes the step of heating a mixture of formic acid and a primary aromatic amine of the benzene series in the presence of a catalyst selected from the group consisting of boric acid, borates and metallic iron.

2. A process for the manufacture of diphenylformamidines which includes the step of heating a mixture of formic acid and a primary aromatic amine of the benzene series in the presence of metallic iron and a boron compound selected from the group consisting of borates and boric acid.

3. A process for the manufacture of diphenylformamidines which comprises heating a mixture of excess of aniline and formic acid together with boric acid, the water produced in the reaction being continuously withdrawn from the reaction zone.

4. A process as claimed in claim 3 in which the boric acid is replaced by cast iron turnings.

5. A process for the manufacture of diphenylformamidines which includes the step of reacting a primary aromatic amine of the benzene series with formic acid in the presence of boric acid.

6. A process for the manufacture of diphenylformamidines which comprises reacting a primary aromatic amine of the benzene series with formic acid in the presence of a catalyst selected from the group consisting of boric acid, borates, and metallic iron, and withdrawing water from the reaction zone.

7. A process for the manufacture of diphenylformamidine which includes the step of reacting aniline with formic acid in the presence of a catalyst selected from the group consisting of boric acid, borates and metallic iron.

8. A process for the manufacture of diphenylformamidine which comprises reacting aniline with formic acid in the presence of a catalyst selected from the group consisting of boric acid, borates, and metallic iron, and continuously withdrawing water from the reaction zone.

9. A process for the manufacture of diphenylformamidine which comprises heating a mixture of excess of aniline and formic acid together with borax and metallic iron, the water produced in the reaction being withdrawn from the reaction zone.

10. A process for the manufacture of diphenylformamidine which includes the step of heating a mixture of excess of aniline and formic acid together with borax and metallic iron.

11. A process for the manufacture of diphenylformamidine which includes the step of heating a mixture of excess of aniline and formic acid in the presence of boric acid.

12. A process for the manufacture of ditolylformamidine which comprises reacting a toluidine with formic acid in the presence of a catalyst selected from the group consisting of boric acid, borates and metallic iron.

13. A process for the manufacture of ditolylformamidine which comprises reacting a toluidine with formic acid in the presence of boric acid, and withdrawing water from the reaction zone.

TOM BIRCHALL.
ERNEST HARRY RODD.